US008698464B2

(12) United States Patent
Enenkel

(10) Patent No.: US 8,698,464 B2
(45) Date of Patent: Apr. 15, 2014

(54) VOLTAGE CONVERTER AND METHOD FOR VOLTAGE CONVERSION

(75) Inventor: Jan Enenkel, Gratkorn (AT)

(73) Assignee: AMS AG, Unterpremstaetten (AT)

( * ) Notice: Subject to any disclaimer, the term of this patent is extended or adjusted under 35 U.S.C. 154(b) by 134 days.

(21) Appl. No.: 13/076,351

(22) Filed: Mar. 30, 2011

(65) Prior Publication Data
US 2011/0260702 A1 Oct. 27, 2011

(30) Foreign Application Priority Data
Mar. 30, 2010 (DE) .......................... 10 2010 013 319

(51) Int. Cl.
G05F 1/12 (2006.01)
(52) U.S. Cl.
USPC .......................................... 323/266; 323/271
(58) Field of Classification Search
USPC .................... 323/266, 271; 363/60
See application file for complete search history.

(56) References Cited

U.S. PATENT DOCUMENTS

| 6,897,709 | B2 | 5/2005 | Henry |
| 2005/0093792 | A1 | 5/2005 | Yamamoto et al. |
| 2007/0008754 | A1* | 1/2007 | Reynolds et al. ............... 363/60 |
| 2008/0157733 | A1* | 7/2008 | Williams ....................... 323/266 |
| 2008/0158915 | A1* | 7/2008 | Williams ..................... 363/21.06 |
| 2009/0102439 | A1* | 4/2009 | Williams ....................... 323/266 |
| 2009/0174345 | A1 | 7/2009 | Vaucourt et al. |
| 2010/0181973 | A1 | 7/2010 | Pauritsch et al. |

FOREIGN PATENT DOCUMENTS

| DE | 10 2007 014 384 | 10/2008 |
| DE | 10 2007 014 398 | 10/2008 |

OTHER PUBLICATIONS

"AS3665—9 Channel Advanced Command Driven RGB/White LED Driver", Product Brief, austriamicrosystems AG, Revision 1.0.

* cited by examiner

Primary Examiner — Jue Zhang
(74) Attorney, Agent, or Firm — McDermott Will & Emery LLP

(57) ABSTRACT

In one embodiment, a voltage converter comprises a step-down converter (DC), to which can be supplied, on the inlet side, an inlet voltage (VBat), to which is supplied, on the inlet side, a control voltage (Vs), and which has an outlet (11) to make available a first outlet voltage (V1), as a function of the inlet voltage (VBat) and the control voltage (Vs), a charge pump (CP), coupled with the step-down converter (DC) on its outlet (11), with an outlet (12) to make available a second outlet voltage (V2), as a function of the inlet voltage (VBat) and the first outlet voltage (V1), and a voltage regulator (Ctl), to which a first effective voltage (Vb), as a function of the first outlet voltage (V1), and a second effective voltage (Vr), as a function of the second outlet voltage (V2), are supplied, and which has an outlet to make available the control voltage (Vs), as a function of the first and the second effective voltages (Vb, Vr). Moreover, a method for voltage conversion is disclosed.

14 Claims, 6 Drawing Sheets

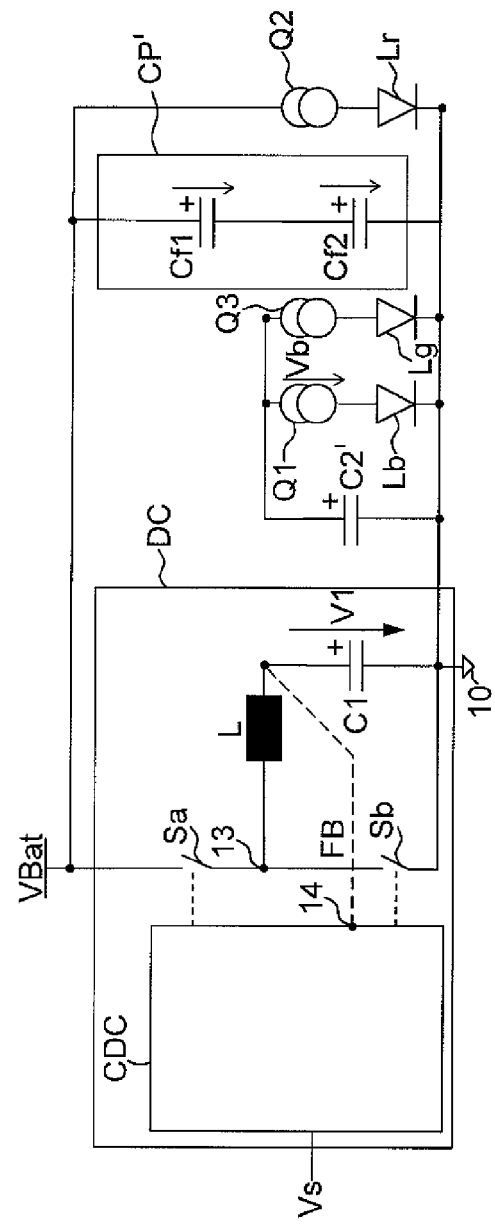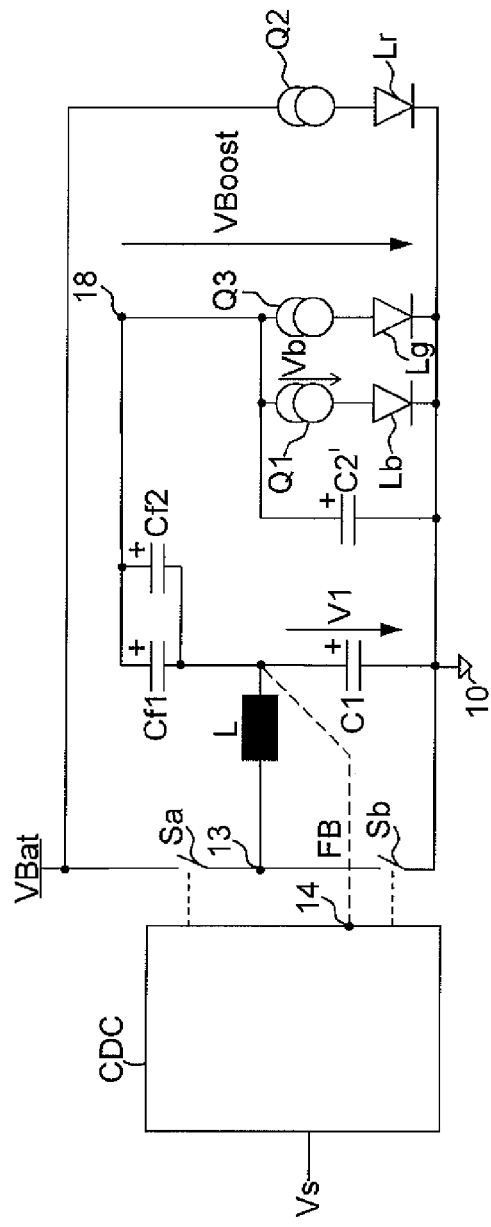
FIG 3A
FIG 3B

VOLTAGE CONVERTER AND METHOD FOR VOLTAGE CONVERSION

RELATED APPLICATIONS

This application claims the priority of German application no. 10 2010 013 319.1 filed Mar. 30, 2010.

FIELD OF THE INVENTION

The invention concerns a voltage converter and a method for voltage conversion.

BACKGROUND OF THE INVENTION

Voltage converters are frequently used to convert higher supply voltages to lower operating voltages. In particular, voltage converters are used for the control of light-emitting diodes, LED. In order to attain a highest possible energy efficiency, it is necessary to operate an LED with an operating voltage in accordance with its characteristic curve. For LEDs typically used, in particular, in mobile radio devices, the operating voltages differ in accordance with the color of the LED. Thus, for example, the voltages which are needed for green or blue LEDs are similar, in the range of approximately 3.1 V, whereas the operating voltage of a red LED, with approximately 1.8 V, is clearly below.

In known circuits, therefore, green and blue LEDs are connected together to a capacitive charge pump or to an inductive voltage converter in order to increase the available battery voltage of the mobile radio device, in case the battery becomes weak. If the battery voltage is still available at the full level or with more than the needed operating voltage of the diodes, then, the excess energy is burned, that is, converted into heat, in a current source connected with a light-emitting diode. This negatively affects the energy efficiency of the solution. In order to also control a red LED efficiently, a separate inductive step-down converter would have to be provided. This increases the costs of the overall solution.

SUMMARY OF THE INVENTION

One object of the invention to provide a voltage converter and a method for voltage conversion, which make possible an efficient provision of two output voltages.

In one embodiment, a voltage converter has a step-down converter, a charge pump coupled with the step-down converter at its outlet, and a voltage regulator. At the inlet side, an inlet voltage can be supplied to the step-down converter; a control voltage is supplied to it at the inlet side; and it has an outlet to provide a first outlet voltage as a function of the inlet voltage and the control voltage. The charge pump has an outlet to provide a second outlet voltage as a function of the inlet voltage and the first outlet voltage. A first effective voltage is supplied to the voltage regulator as a function of the first outlet voltage and a second effective voltage, as a function of the second outlet voltage. The voltage regulator comprises an outlet to provide the control voltage as a function of the first and the second effective voltages.

The step-down converter converts the supplied inlet voltage into the first outlet voltage. The charge pump provides the second outlet voltage. The voltage regulator detects the first effective voltage, which is proportional to the first outlet voltage, and the second effective voltage, which is proportional to the second outlet voltage. The voltage regulator determines the control voltage as a function of the first and second effective voltage. The control voltage is supplied to an inlet of the step-down converter. The level of the first outlet voltage is adapted as a function of the control voltage.

Advantageously, the first and the second outlet voltages are adapted, in their respective levels, to an individually connectable electric consumer, for example, an LED. Thus, for example, a green and a blue LED can be operated with the first outlet voltage and a red LED can be operated with the second outlet voltage in an energy-efficient way. A burning of excess energy in current sources connected before the electrical consumers is reduced.

In one refinement, the step-down converter has a first and a second connection. The inlet voltage can be supplied to the first connection via a charging switch. The first connection is coupled with a reference potential terminal via a discharge switch. The first connection is connected with a series circuit comprising an inductive charge storage unit and a first capacitive charge storage unit, which is referred to the reference potential terminal. A feedback signal is supplied to the second connection. A connection point between the inductive charge storage unit and the first capacitive charge storage unit forms the outlet of the step-down converter.

The inductive charge storage unit is charged by means of the inlet voltage via the charging switch. The energy is then transferred, when the discharge switch is closed, from the inductive charge storage unit to the first capacitive charge storage unit. The first outlet voltage is provided at the first capacitive charge storage unit. The charging and provision take place in a cyclical sequence by the alternating closing and opening of the charging and discharge switches.

In another embodiment, the feedback signal is made available at the outlet of the step-down converter as a function of an instantaneous value of the first outlet voltage.

With the aid of the feedback signal, the first outlet voltage is regulated to a value needed by an electrical consumer by the suitable control of the charging and discharge switches.

In one refinement, the charge pump comprises a first connection to which the inlet voltage can be supplied, a second and a third connection, which are connected, in an individually switchable manner, with the outlet of the step-down converter, a first, a second, a third, and a fourth switch. The first switch is connected between the first connection of the charge pump and a positive connection of a second capacitive charge storage unit. The second switch is connected between the second connection of the charge pump and the positive connection of the second capacitive charge storage unit. The third switch is connected between a negative connection of the second capacitive charge storage unit and the outlet of the charge pump. The fourth switch is connected between the third connection of the charge pump and the negative connection of the second capacitive charge storage unit.

By closing the first and the fourth switches, the second capacitive charge storage unit is charged by means of the inlet voltage, so that a voltage at the level of a difference between the inlet voltage and the first outlet voltage is applied on it. Subsequently, the first and the fourth switches are opened and the second and the third switches are closed. Thus, the voltage drop on the second capacitive charge storage unit is subtracted from the first outlet voltage. The second outlet voltage is made available at the level of this difference. This switching of the second capacitive charge storage unit takes place cyclically.

The energy stored in the inductive charge storage unit of the step-down converter is advantageously separated from the energy stored in the second capacitive charge storage unit of the charge pump. In this way, the size of the coil used as the inductive charge storage unit can be selected smaller in comparison with traditional solutions. This makes a reduction of the costs possible.

In one refinement, a first current source for the operation of a first electrical consumer, which is referred to the reference potential terminal, is connected to the outlet of the step-down converter, in a switchable manner via a fifth switch.

The first electrical consumer here comprises, for example, a green or a blue light-emitting diode.

In another embodiment, the first effective voltage is formed as a function of a voltage drop across the first current source.

In another refinement, a second current source to operate a second electrical consumer, which is referred to the reference potential terminal, and a stabilization capacitor, which is referred to the reference potential terminal, are connected to the outlet of the charge pump.

The second electrical consumer, for example, is here constructed as a red LED.

In another embodiment, the second effective voltage is formed as a function of a voltage drop across the second current source.

The voltage regulator regulates the first outlet voltage in such a way that the first and the second effective voltages are adjusted in such a way that the first and the second current sources are each operated in the saturation range. The effective voltage which drops on the current source in the saturation range is, for example, approximately 200 mV.

In another embodiment, the first and the second outlet voltages are each smaller than the inlet voltage.

This is attained by the special circuitry of the step-down converter with the charge pump. Remarkably, a lower voltage than the inlet voltage is made available at the outlet of the charge pump. The charge pump is so-to-speak operated in a subtracting mode. In this way, the energy efficiency is advantageously clearly increased in comparison with conventional solutions.

In one embodiment of a method for the voltage conversion, a step-down converter with an inductive and a first capacitive charge storage unit is provided. In addition, a charge pump with a second capacitive charge unit and a voltage regulator are provided. By supplying an inlet voltage, the first capacitive charge storage unit is charged to a first outlet voltage via an inductive charge storage unit. The second capacitive charge unit is charged to a difference between the supply voltage and the first outlet voltage. The second capacitive charge storage unit is switched and a second outlet voltage is provided. The voltage regulator detects a first effective voltage, proportional to the first outlet voltage, and a second effective voltage, proportional to the second outlet voltage. As a function of the first and second effective voltages, the voltage regulator determines a control voltage. By means of the control voltage, the first outlet voltage is established.

With the method described, it is advantageously possible to make available the first and the second outlet voltages at different levels. Thus, different electrical consumers can be operated with a greater efficiency, since the first and second outlet voltages are made available as much as possible at the level of the needed operating voltage of each consumer.

In a refinement, the second outlet voltage is produced as a difference between the first outlet voltage and a voltage drop on the second capacitive charge storage.

In another embodiment, the first outlet voltage is produced as a sum of the control voltage and a feedback signal, which is proportional to an instantaneous value of the first outlet voltage.

The step-down converter therefore increases an instantaneous value of the first outlet voltage by the value of the control voltage.

In a refinement, the control voltage is produced by the determination of a smallest voltage from a set comprising the first and the second effective voltages and the subsequent subtraction from a nominal voltage.

In its level, the nominal voltage is adapted to a voltage drop across the first or second current source, when this is operated in the saturated range. As soon as one of the effective voltages has a lower value than the nominal voltage, the first outlet voltage is increased by the difference between the nominal voltage and the actual effective voltage.

BRIEF DESCRIPTION OF THE DRAWINGS

FIGS. 3A and 3B each show partial circuits for an individual switching state of the voltage converter from FIG. 1 in another operational mode;

DETAILED DESCRIPTION OF THE DRAWINGS

Figure 1:
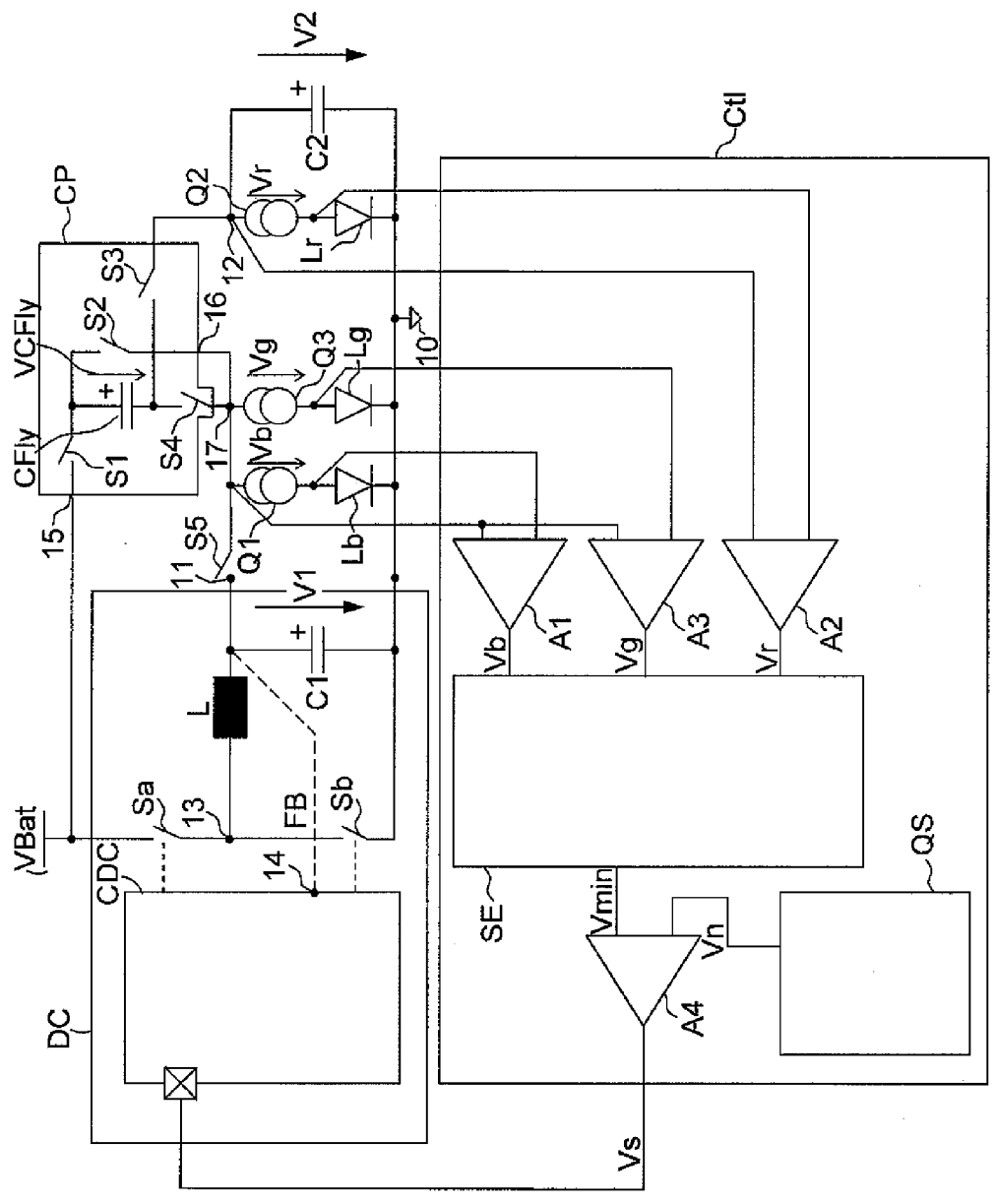
FIG. 1 shows an embodiment of a voltage converter according to the invention.

FIG. 1 shows an embodiment of the voltage converter according to the invention. The voltage converter comprises a step-down converter DC, a charge pump CP, and a voltage regulator Ctl. The step-down converter DC has a control CDC, a first connection 13, to which an inlet voltage VBat can be supplied via a charging switch Sa, a second connection 14, to which a feedback signal FB is supplied, and an outlet 11, at which a first outlet voltage V1 is made available. Via another inlet, a control voltage Vs is supplied to the step-down converter DC. An inductive charge storage unit L is connected between the first connection 13 and the outlet 11. A first capacitive charge storage unit C1 is connected between the outlet 11 and a reference potential terminal 10. The first outlet voltage V1 drops on this capacitive charge storage unit C1. A discharge switch Sb is connected between the first connection 13 and the reference potential terminal 10.

By means of the control CDC, the step-down converter DC makes available the first outlet voltage V1 as a function of the inlet voltage VBat and the control voltage Vs by a suitable control of the switches Sa and Sb.

The charge pump CP is connected to the outlet 11 of the step-down converter DC via a fifth switch S5. The charge pump CP has a first connection 15, to which the inlet voltage VBat can be supplied, a second and a third connection 16 and 17, which are each coupled with the outlet 11 of the step-down converter DC via the fifth switch S5. Moreover, the charge pump CP comprises a first, a second, a third, and a fourth switch S1, S2, S3, S4 and a connectable second capacitive charge storage unit CFly. Switches S1 to S5 are operated by the voltage regulator Ctl. The first switch S1 is connected between the positive connection of the second capacitive charge storage unit CFly and the first connection 15 of the charge pump CP. The second switch S2 is connected between the positive connection of the second capacitive charge storage unit CFly and the second connection 16 of the charge pump CP. The third switch S3 is connected between a negative connection of the second capacitive charge storage unit CFly and an outlet 12 of the charge pump CP. The fourth switch S4 is connected between the negative connection of the second capacitive charge storage unit CFly and the third connection 17 of the charge pump CP.

The charge pump CP makes available, on its outlet 12, a second outlet voltage V2 as a function of the inlet voltage VBat and the first outlet voltage V1.

A first current source Q1 and a first electrical consumer Lb, which is referred to the reference potential terminal 10, are connected to the outlet 11 of the step-down converter DC via the fifth switch S5. A second current source Q2 and a second electrical consumer Lr, which is also referred to the reference potential terminal 10, are connected to the outlet 12 of the charge pump CP. Parallel to this, a stabilization capacitor C2, which is also referred to the reference potential terminal 10, is coupled on the outlet 12 of the charge pump CP.

A first effective voltage Vb drops on the first current source Q1; a second effective voltage Vr drops on the second current source Q2. The first effective voltage Vb is a function of the first outlet voltage V1. The second effective voltage Vr is a function of the second outlet voltage V2.

The voltage regulator Ctl is, on the inlet side, connected with the outlet 11 of the step-down converter DC and the outlet 12 of the charge pump CP. The voltage regulator Ctl has a first and a second differential amplifier A1, A2, which are each coupled with an inlet of the voltage regulator Ctl. A selection unit SE is coupled with the outlets of the first and second differential amplifier A1, A2. Moreover, a subtracting unit A4 is provided, which is coupled with an outlet of the selection unit SE and with a voltage source QS. An outlet of the subtracting unit A4 forms an outlet of the voltage regulator Ctl, on which the control voltage Vs is made available.

The first effective voltage Vb is supplied to the first differential amplifier A1 of the voltage regulator Ctl. The second effective voltage Vr is supplied to the second differential amplifier A2 of the voltage regulator Ctl. The selection unit SE determines the smallest voltage Vmin, which it makes available at its outlet, from the supplied effective voltages Vb and Vr. The subtracting unit A4 forms the difference between the smallest voltage Vmin and a nominal voltage Vn, provided by the voltage source QS. This difference is made available as the control voltage Vs.

With the switching on of the inlet voltage VBat, the first capacitive charge storage unit C1 is charged via the inductive charge storage unit L to the first outlet voltage V1. In addition, the second capacitive charge storage unit CFly is charged to a voltage VCFly with a closed first and fourth switch S1, S4. The voltage VCFly is thereby a difference between the inlet voltage VBat and the first outlet voltage V1. Subsequently, the second capacitive charge storage unit CFly is switched by the opening of the first and the fourth switches S1 and S4 and the closing of the second and third switches S2 and S3. The second outlet voltage V2 is provided. In its level, it corresponds to a difference between the first outlet voltage V1 and the voltage VCFly which drops on the second capacitive charge storage unit CFly. The voltage regulator Ctl detects the first and the second effective voltages Vb and Vr. As soon as one of the two effective voltages Vb or Vr falls below the nominal voltage Vn, a positive control voltage Vs is made available and supplied to the step-down converter DC. The step-down converter DC detects an instantaneous value of the first outlet voltage V1 via the feedback signal FB. The instantaneous value of the first outlet voltage V1 is subsequently increased by the value of the control voltage Vs.

The first and the second electrical consumers Lb and Lr are each constructed, by way of example, as light-emitting diodes. The first electrical consumer Lb has, for example, a blue LED; the second electrical consumer Lr has, for example, a red LED. The first outlet voltage V1 is, for example, made available at a level of 3.2 V corresponding to the operating voltage of a blue LED. The second outlet voltage V2 is, for example, made available at a level of 1.8 V, namely, the voltage needed by the red LED. The first and the second current sources Q1 and Q2 are each operated in the saturated range. The nominal voltage Vn, which is generated by the voltage source QS, is approximately in the range of 200 mV, so that it corresponds to the saturation voltage of the first and second current sources Q1 and Q2. Thus, the first outlet voltage V1 is established by the voltage regulator Ctl in such a way that the first and the second current sources Q1 and Q2 operate in the saturated range. Consequently, it is ensured that the connected electrical consumers Lb and Lr are each operated in the optimal range, so that, advantageously, as little energy as possible has to be burned in the first and second current sources Q1 and Q2.

In another embodiment, another current source Q3 for the operation of another electrical consumer Lg is connected to the outlet 11 of the step-down converter DC via the fifth switch S5. The other electrical consumer Lg has, for example, a green LED and is likewise referred to the reference potential connection 10. In this embodiment, another differential amplifier A3 is provided within the voltage regulator Ctl. Another effective voltage Vg which drops across the additional current source Q3 is supplied to the additional differential amplifier A3. The smallest voltage Vmin is made available, in this case, from the set of all supplied effective voltages Vb, Vg, and Vr. Advantageously, the additional electrical consumer Lg is operated with the same voltage as the first electrical consumer Lb, since green and blue LEDs require similar emitter-diode voltages.

Advantageously, the first and second outlet voltages V1 and V2 are made available in such a way that they are optimally adapted to a voltage which is individually needed by a special electrical consumer Lb or Lr. A burning of excess energy in the first or second current sources Q1 or Q2 connected before the respective consumer is superfluous. In this way, a particularly high efficiency of the voltage converter is attained.

Figure 2A:
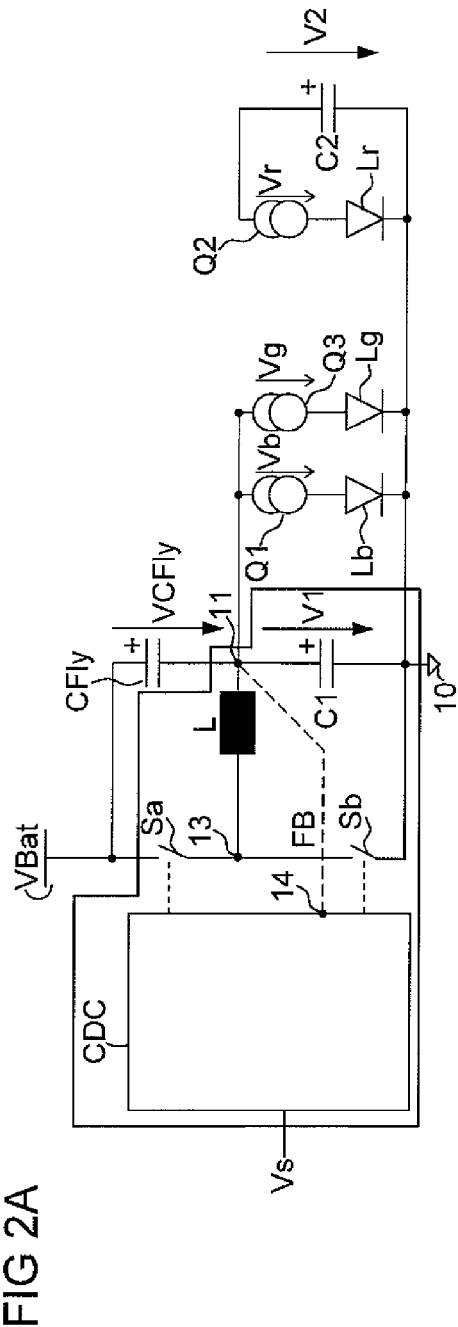
FIGS. 2A and 2B each show a partial circuit for an individual switching state of the embodiment, in accordance with FIG. 1.
Figure 2B:
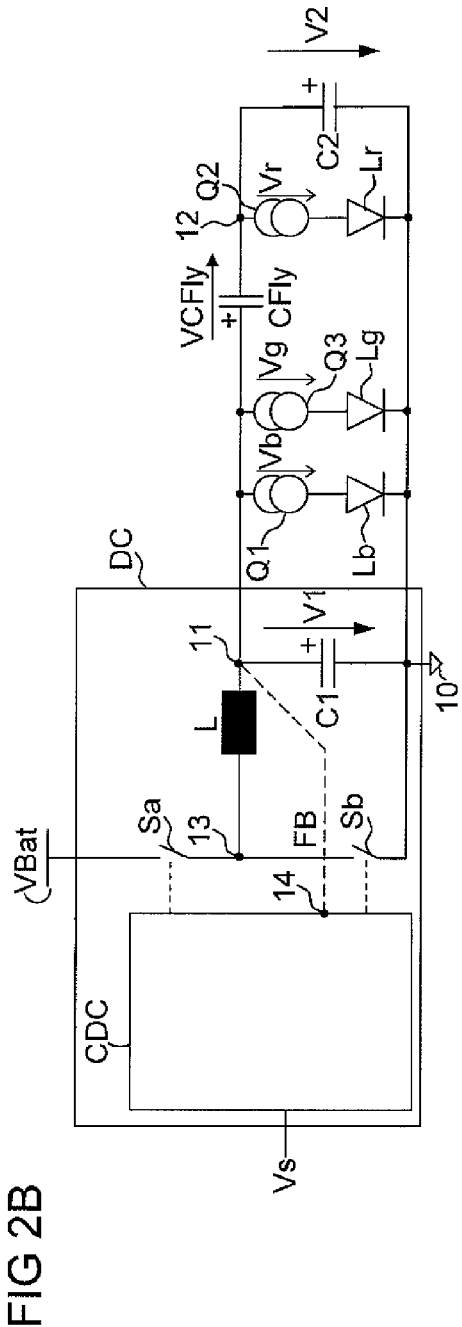

FIGS. 2A and 2B each show a partial circuit for a switching state of the embodiment according to FIG. 1. The voltage regulator Ctl is not shown in both partial circuits; its function, however, is implemented as described under FIG. 1. The switches S1 to S5 are not shown here for reasons of a better overview.

FIG. 2A shows a switching state of the voltage converter with a closed first, fourth, and fifth switch S1, S4, and S5. In this state, the second capacitive charge storage unit CFly is charged to the voltage VCFly. In one phase, the charging switch Sa of the step-down converter DC is thereby closed, whereas the discharge switch Sb is opened. Accordingly, a current caused by the connection to the inlet voltage VBat flows via the charging switch Sa through the inductive charge storage unit L to the first capacitive charge storage unit C1. This current flow brings about a storage of energy in the inductive charge storage unit L. In another switching phase, the charging switch Sa of the step-down converter DC is opened, whereas the discharge switch Sb of the step-down converter DC is closed. Thus, the energy from the inductive charge storage unit L is transferred to the first capacitive charge storage unit C1. The first outlet voltage V1 is made available. Its actual value is supplied via the feedback signal FB to the control CDC of the step-down converter DC.

By the supply of the control voltage Vs, the control CDC of the step-down converter DC regulates the first outlet voltage V1 by a suitable opening and closing of the charging and discharge switches Sa, Sb, so that the connected first, second, and the additional current sources Q1, Q2, and Q3 are each operated in the saturated range. During a renewed charging of the second capacitive charge storage unit CFly, the stabilization capacitor C2 holds the second outlet voltage V2.

The switching state of the voltage converter, shown in FIG. 2B, is attained by opening the first and fourth switches S1, S4 of the charge pump CP and the closing of the second and third switches S2, S3 of the charge pump CP. In this state, the energy stored in the second capacitive charge storage unit CFly at the outlet 12 of the charge pump CP is transferred to the stabilization capacitor C2. The second outlet voltage V2 is made available as a difference between the first outlet voltage V1 and the voltage VCFly of the second capacitive charge storage unit CFly. The step-down converter DC regulates the first outlet voltage V1 with the aid of the feedback signal FB and the control voltage Vs to a value at which an individual voltage drop on the first, second, and third current sources Q1, Q2, Q3 corresponds to the voltage drop in the saturation operation.

The switching between the switching state in FIG. 2A, that is, the charging of the second capacitive charge storage unit CFly, and the switching state of FIG. 2B, that is, the discharge of the second capacitive charge storage unit CFly, takes place cyclically, in particular, with a fixed frequency. The charge pump CP is not regulated separately.

Advantageously, the step-down conversion is realized in two ways with this solution, which merely has one inductive charge storage unit L and two capacitive charge storage units C1 and CFly. This is also designated as a dual-buck mode or a step-down conversion mode. Surprisingly, the second outlet voltage V2 made available by the charge pump CP is also smaller than the inlet voltage VBat. This makes it possible for the first and the second outlet voltages V1, V2 to each be made available as the voltage needed by the connected electrical consumer. This makes possible a high efficiency of the voltage converter.

FIGS. 3A and 3B show partial circuits each for a switching state of the voltage converter from FIG. 1 in another mode of operation. Once again, the switches S1 to S5 are not shown for reasons of a better overview. As soon as the voltage on the second electrical consumer Lr, that is, the red LED, becomes too small, the voltage converter is switched to a step-up converter mode, a so-called boost mode. This is the case especially when the inlet voltage VBat is lowered to the value of the first outlet voltage V1, with a progressive emptying of the energy source, which makes available the inlet voltage VBat. Then, the sum of the second outlet voltage V2 and the voltage on the second capacitive charge storage unit CFly is also smaller than the first outlet voltage V1. Consequently, as can be seen in FIGS. 3A and 3B, the second electrical consumer Lr is operated via the second current source Q2 directly with the inlet voltage VBat. This is attained by the closing of the first and third switches S1, S3 of the charge pump CP.

For this mode of operation, another charge pump CP' is provided, which has two capacitors Cf1, Cf2, whose nominal capacitance values are adapted to one another. In addition, another stabilization capacitor C2' is provided, which is connected parallel to the series circuit comprising the first current source Q1 and the first electrical consumer Lb.

In the state of the step-up converter mode of the voltage converter shown in FIG. 3A, the capacitors Cf1 and Cf2 are connected in series between the inlet voltage VBat and the reference potential terminal 10. In this way, the capacitors corresponding to the principle of the capacitive voltage divider are each charged to half the inlet voltage VBat. Corresponding switches, which make possible this circuitry, are not shown for reasons of clarity; their position and control, however, can be easily derived by someone skilled in the art.

In the state of the step-up converter mode shown in FIG. 3B, the two capacitors Cf1 and Cf2 are connected in parallel between the outlet 11 of the step-down converter DC and another outlet connection 18. Thus, on the outlet connection 18, another outlet voltage VBoost is made available. The additional outlet voltage VBoost comprises a sum of the first outlet voltage V1 and half the inlet voltage VBat. The additional outlet voltage VBoost is supplied to the first electrical consumer Lb and the first current source Q1.

In this mode of operation, the voltage converter is operated to the end of the service life of the energy source, which makes available the inlet voltage VBat.

Also in this mode of operation, the additional electrical consumer Lg can be operated, in another embodiment, by means of the additional current source Q3 and the first outlet voltage V1.

Figure 4:
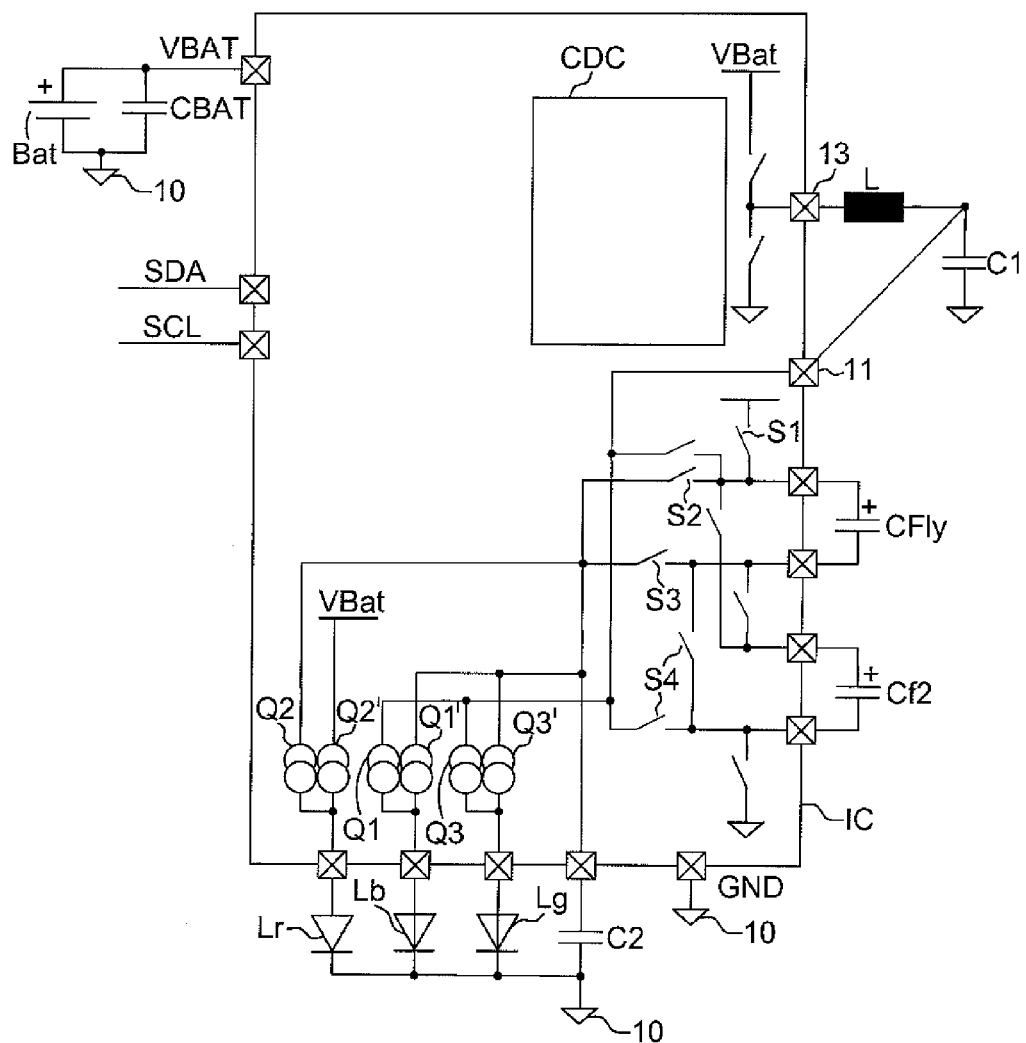
FIG. 4 shows another embodiment of the voltage converter according to the invention.

FIG. 4 shows another embodiment of the voltage converter according to the invention. This embodiment essentially represents an expansion of the embodiment shown in FIG. 1. The function of corresponding elements, which are already known from FIG. 1, is therefore not repeated at this point. Control lines for driving the switches are accordingly not shown for reasons of a better overview, but can be readily deduced by someone skilled in the art. Also, the voltage regulator Ctl is no longer explicitly shown.

The voltage converter in FIG. 4 comprises additional control inlets SDA, SCL. Moreover, additional current sources Q1', Q2', and Q3' are provided, which simplify the switching between step-down converter and step-up converter modes in the implementation. The voltage converter is, for example, implemented as the semiconductor chip IC. Just like the capacitive charge storage units C1 and CFly, the capacitors C2 and Cf2, and the inductive charge storage unit L, the electrical consumers Lg, Lb, and Lr are connected externally to the chip IC. The second capacitive charge storage unit CFly is thereby used in the step-up converter mode, in accordance with the description and the FIGS. 3A and 3B, for the capacitor Cf1.

Figure 5A:
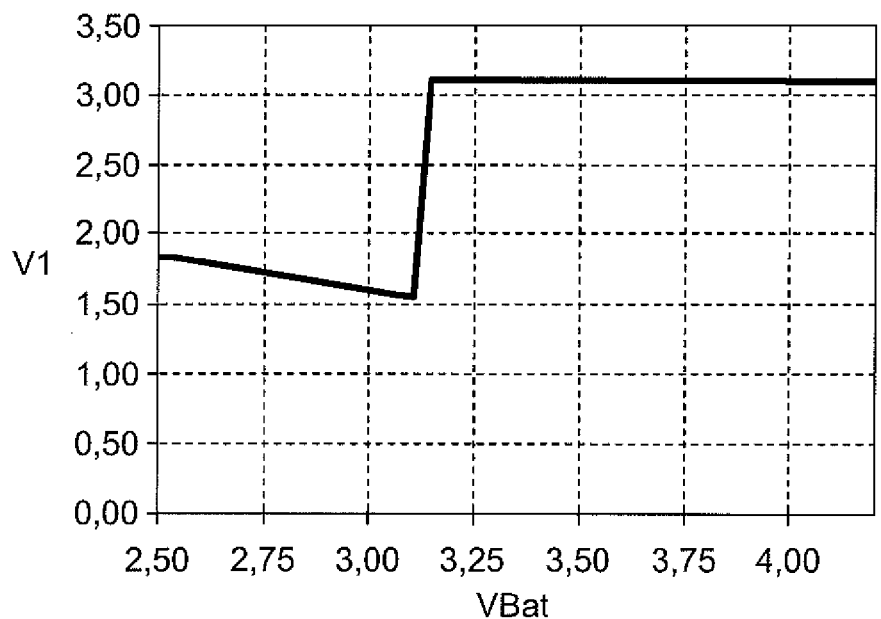
FIG. 5A and 5B show example voltage courses on the electrical consumers.
Figure 5B:
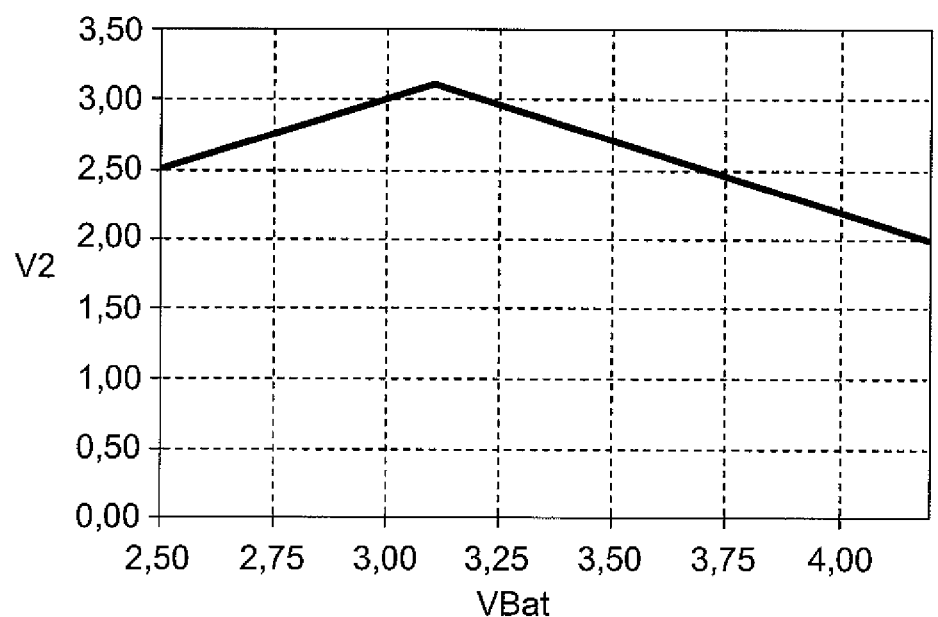

FIGS. 5A and 5B show, by way of example, voltage courses on the electrical consumers. FIG. 5A shows the course of the first outlet voltage V1, referred to the inlet voltage VBat. With values of the inlet voltage VBat larger than approximately 3.1 V, the voltage converter is operated in the step-down converter mode, according to the invention. The charge pump thereby functions according to the reversed method, as a so-called Reversed Charge Pump. If the inlet voltage VBat is smaller than 3.1 V, as a function of the forward voltage of the used LEDs, the voltage converter is operated in the step-up converter mode, in accordance with FIGS. 3A and 3B.

FIG. 5*b* shows the course of the second outlet voltage V2, referred to the inlet voltage VBat. With inlet voltage values between 3.1 and 4.2 V, the second outlet voltage V2 is made available in the step-down conversion mode, in accordance with the invention. If the inlet voltage VBat falls below 3.1 V, then the second outlet voltage V2 is made available at the level of the then still available inlet voltage VBat.

Figure 6:
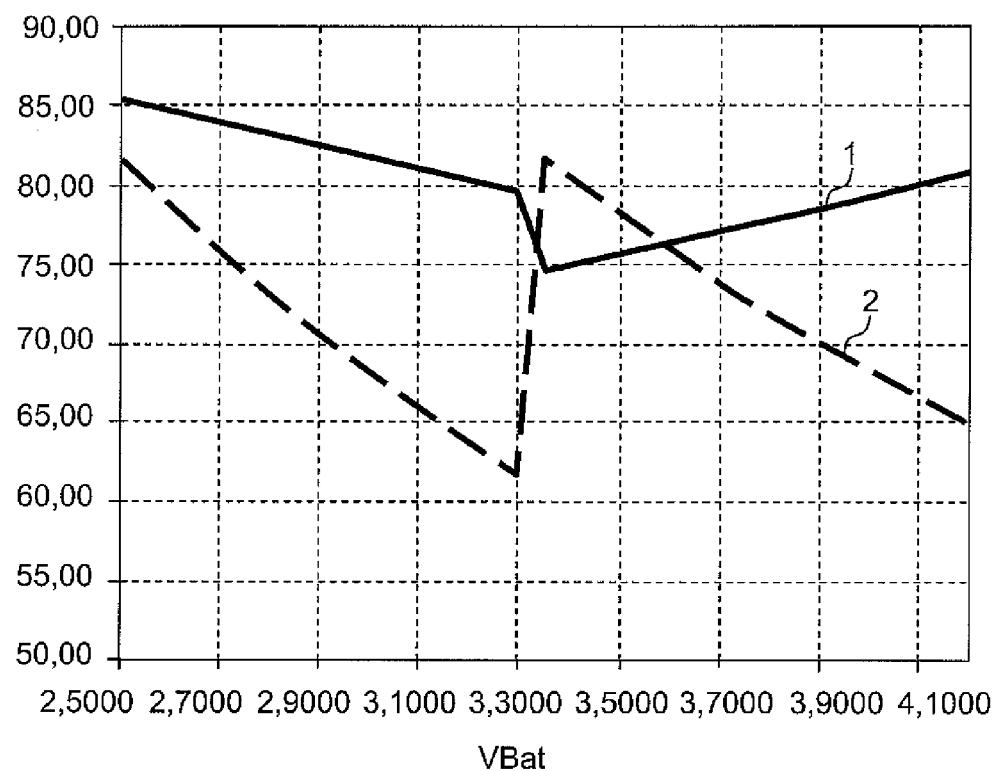
FIG. 6 shows an example efficiency diagram of a voltage converter according to the invention.

FIG. 6 shows an example efficiency diagram of a voltage converter, according to the invention. The efficiency is shown in percent, referred to the inlet voltage VBat. The line marked with 1 shows the efficiency of the voltage converter according to the invention, in comparison with a charge pump, according to the state of the art, whose efficiency course is shown with a dashed line and marked with 2. From the diagram, it is clear that the average efficiency of the voltage converter according to the invention is approximately 80%, whereas the average efficiency with a charge pump, in accordance with the state of the art, is approximately 71%.

It should be noted that the embodiments described in the various figures could be readily combined. In addition, other modifications are possible, for example, the provisioning of a larger number of charge storage units in the charge pump.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

We claim:

1. A voltage converter comprising:
    a step-down converter, to which can be supplied, on the inlet side, an inlet voltage, to which is supplied, on the inlet side, a control voltage, and which has an outlet to make available a first outlet voltage as a function of the inlet voltage and the control voltage;
    a charge pump, coupled with the step-down converter, on its outlet, with an outlet to make available a second outlet voltage, as a function of the inlet voltage and the first outlet voltage; and
    a voltage regulator, to which are supplied a first effective voltage as a function of the first outlet voltage and a second effective voltage as a function of the second outlet voltage, and which has an outlet for making available the control voltage as a function of the first and the second effective voltages.

2. The voltage converter according to claim 1, wherein the step-down converter includes:
    a first connection, to which the inlet voltage is supplied via a charging switch, which is coupled with a reference potential terminal via a discharge switch, and which is connected with a series circuit comprising an inductive charge storage unit and a first capacitive charge storage unit, which is referred to the reference potential terminal; and
    a second connection, to which a feedback signal is supplied;
    wherein a connection point between the inductive charge storage unit and the first capacitive charge storage unit forms the outlet of the step-down converter.

3. The voltage converter according to claim 1, wherein the feedback signal is made available at the outlet of the step-down converter as a function of an instantaneous value of the first outlet voltage.

4. The voltage converter according to claim 1, wherein the charge pump includes:
    a first connection, to which the inlet voltage can be supplied;
    a second and a third connection, which are connected, in a switchable manner, with the outlet of the step-down converter;
    a first switch, which is connected between the first connection of the charge pump and a positive connection of a second capacitive charge storage unit;
    a second switch, which is connected between the second connection of the charge pump and the positive connection of the second capacitive charge storage unit;
    a third switch, which is connected between a negative connection of the second capacitive charge storage unit and the outlet of the charge pump; and
    a fourth switch, which is connected between the third connection of the charge pump and the negative connection of the second capacitive charge storage unit.

5. The voltage converter according to claim 1, wherein a first current source for the operation of a first electrical consumer, which is referred to the reference potential terminal, is connected with the outlet of the step-down converter, in a switchable manner, via a fifth switch.

6. The voltage converter according to claim 5, wherein the first effective voltage is formed as a function of a voltage drop across the first current source.

7. The voltage converter according to claim 1, wherein a second current source for the operation of a second electrical consumer, which is referred to the reference potential terminal, and a stabilization capacitor, which is referred to the reference potential terminal, are connected with the outlet of the charge pump.

8. The voltage converter according to claim 7, wherein the second effective voltage is formed as a function of a voltage drop across the second current source.

9. The voltage converter according to claim 1, wherein the first and the second outlet voltages are each smaller than the inlet voltage.

10. A method for voltage conversion, comprising:
    providing a step-down converter with an inductive charge storage unit and a first capacitive charge storage unit;
    providing a charge pump with a second capacitive charge storage unit;
    providing a voltage regulator;
    charging of the first capacitive charge storage unit via the inductive charge storage unit by the supply of an inlet voltage to a first outlet voltage;
    charging of the second capacitive charge storage unit to a difference between the inlet voltage and the first outlet voltage;
    switching of the second capacitive charge storage unit and providing a second outlet voltage;
    detecting a first effective voltage, proportional to the first outlet voltage, and a second effective voltage, proportional to the second outlet voltage, by the voltage regulator;
    determining a control voltage, as a function of the first and second effective voltage; and
    adjusting the first outlet voltage by means of the control voltage.

11. The method according to claim 10, wherein the second outlet voltage is produced as a difference from the first outlet voltage and the voltage drop on the second capacitive charge storage.

12. The method according to claim 10, wherein the first outlet voltage is produced as a sum of the control voltage and a feedback signal, which is proportional to an instantaneous value of the first outlet voltage.

13. The method according to claim 10, wherein the control voltage is produced by determining a smallest voltage from a set comprising the first and second effective voltages and the subsequent subtraction from a nominal voltage.

14. The method according to claim 10, wherein the switching of the second capacitive charge storage unit takes place cyclically at a constant frequency.

* * * * *